United States Patent [19]

Kruzick

[11] Patent Number: 5,531,559
[45] Date of Patent: Jul. 2, 1996

[54] VEHICLE MOUNTED HOOK HOIST FOR LOADING, TRANSPORTING AND DUMPING CONTAINERS

[75] Inventor: Kent Kruzick, Winamac, Ind.

[73] Assignee: Galbreath, Inc., Winamac, Ind.

[21] Appl. No.: 81,522

[22] Filed: Oct. 1, 1993

[51] Int. Cl.$^6$ ................................................ B60P 1/28
[52] U.S. Cl. ...................................... 414/498; 414/546
[58] Field of Search .................................... 414/498, 499, 414/500, 346, 546, 547, 549, 553, 552, 555, 680, 697, 743; 254/93 R

[56] References Cited

U.S. PATENT DOCUMENTS

| | | | |
|---|---|---|---|
| 3,819,075 | 6/1974 | Derain | 414/498 X |
| 3,892,323 | 7/1975 | Corompt | 414/498 X |
| 3,988,035 | 10/1976 | Corompt | 414/498 X |

FOREIGN PATENT DOCUMENTS

| | | | |
|---|---|---|---|
| 2321399 | 3/1977 | France | 414/498 |
| 2561184 | 9/1985 | France | 414/498 |
| 43219 | 4/1977 | Japan | 414/498 |
| 198133 | 12/1982 | Japan | 414/498 |
| 202943 | 9/1986 | Japan | 414/498 |

*Primary Examiner*—Frank E. Werner
*Attorney, Agent, or Firm*—Woodard, Emhardt, Naughton, Moriarty & McNett

[57] ABSTRACT

A vehicle mounted hoist for loading, transporting and dumping containers including a tail frame pivotally mounted at a tail frame pivot pin to the rear of a vehicle; a jib assembly pivotally mounted to the tail frame at a jib assembly pivot pin forwardly of the tail frame pivot pin, the jib assembly including a telescopically extendable jib with an outboard end to which is connected a hook configured to engage with a complementary configured apparatus on a container; a pair of hydraulic cylinders connected between the vehicle and the jib assembly and operable to pivot the jib assembly about one of the pivot pins; and, a locking assembly connected with the tail frame and the jib assembly and having a locked condition wherein the jib assembly is locked to pivot as a unit with the tail frame about the tail frame pivot pin, and having an unlocked position wherein the jib assembly is unlocked from the tail frame and able to be pivoted about the jib assembly pivot pin, and wherein the locking assembly is operably connected with the jib so that complete retraction of the jib changes the locking assembly from the locked to the unlocked condition only when the first hydraulic cylinders are retracted and the jib assembly and the tail frame are both in a rest position lying substantially horizontal atop the vehicle.

14 Claims, 5 Drawing Sheets

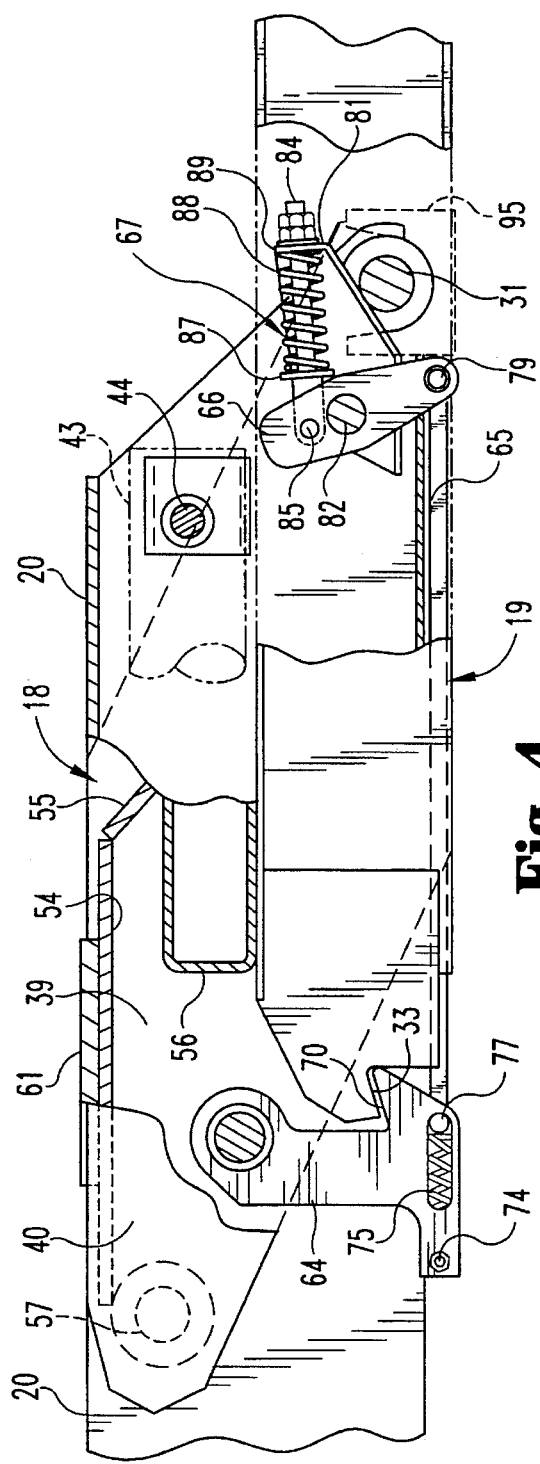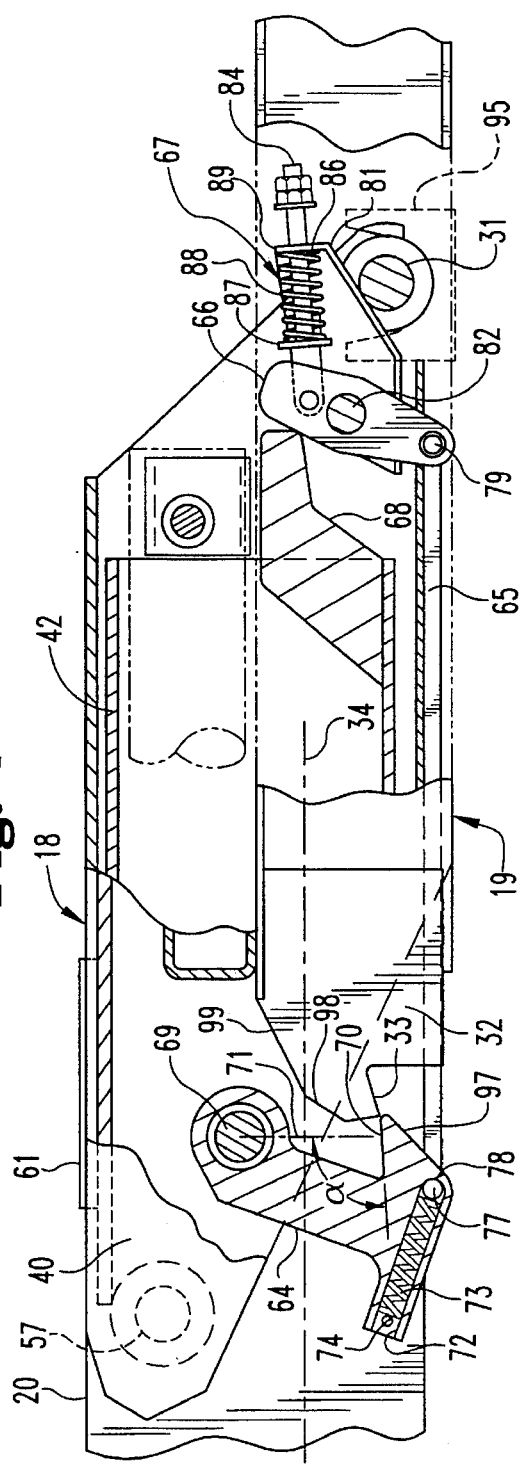

5,531,559

VEHICLE MOUNTED HOOK HOIST FOR LOADING, TRANSPORTING AND DUMPING CONTAINERS

FIELD OF THE INVENTION

The present invention relates to the field of transportable containers and vehicles for picking up, transporting, setting off, and dumping such containers.

BACKGROUND OF THE INVENTION

There exists a type of container hoist called a hook hoist which includes an L-shaped hoist arm pivotally mounted at the rear of a trailer. A part of the arm called a "jib" is telescopically extendable and has a hook mounted to the outboard end thereof. The arm is connected at its end opposite the jib to the trailer via a tilt frame such that, when unlocked with the tilt frame, hydraulic cylinders pivot the hoist arm back approximately 150° where it may engage with a container and be pivoted forwardly, thereby lifting the container up onto the vehicle chassis. Extension of the jib pulls the container forwardly to the desired transport position. When the hoist arm is locked with the tilt frame, actuation of the same cylinders causes the hoist arm and tilt frame to pivot as a unit about the tail end of the trailer, thereby dumping the container mounted thereon. The locking mechanism is designed so that the hoist arm is automatically, mechanically unlocked from the tilt frame upon retraction of the telescopically mounted jib.

If the mechanism locking the hoist arm with the tilt frame is disengaged while the two are pivoted upwardly with a container, the whole assembly may come crashing down with considerable damage to hoist and container. Various safety mechanisms have been designed to prevent this occurrence. In one such mechanism a hydraulic interlock mechanism precludes hydraulic operation (i.e., extension or retraction) of the jib whenever the hoist-arm-pivoting cylinder assembly is not Fully retracted, thereby precluding the possibility of accidently unlocking the hoist arm from the tilt frame while the hoist arm is pivoted. Unfortunately, this also precludes extension of the jib at the conclusion of a container unloading sequence, such extension stroke being useful to drive a container onto a loading dock.

What is needed is a hoist mechanism which provides the dual loading/unloading and dumping capability and which includes a safe interlock mechanism to allow for extension or retraction of the hoist arm at any time where the hoist arm and tilt frame are locked together and pivoted away from horizontal, without the danger that hoist arm and tilt frame will accidentally become disengaged.

BRIEF DESCRIPTION OF THE DRAWINGS

FIG. 4 is a side, partially cross-sectional, fragmented view of jib assembly 18 and tail frame 19 of the hoist of FIG. 1, in a horizontal rest position with spring-bias assembly 67 biasing latches 64 in a locked condition.

FIG. 5 is a side, partially cross-sectional, fragmented view of jib assembly 18 and tail frame 19 of the hoist of FIG. 1, in a horizontal rest position, with leg 42 retracted, pivoting link 66 of spring-bias assembly 67 to pivot latches 64 to an unlocked condition.

FIG. 7 is a cross-sectional view of jib assembly 18 of the hoist of FIG. 1.

SUMMARY OF THE INVENTION

Figure 1:
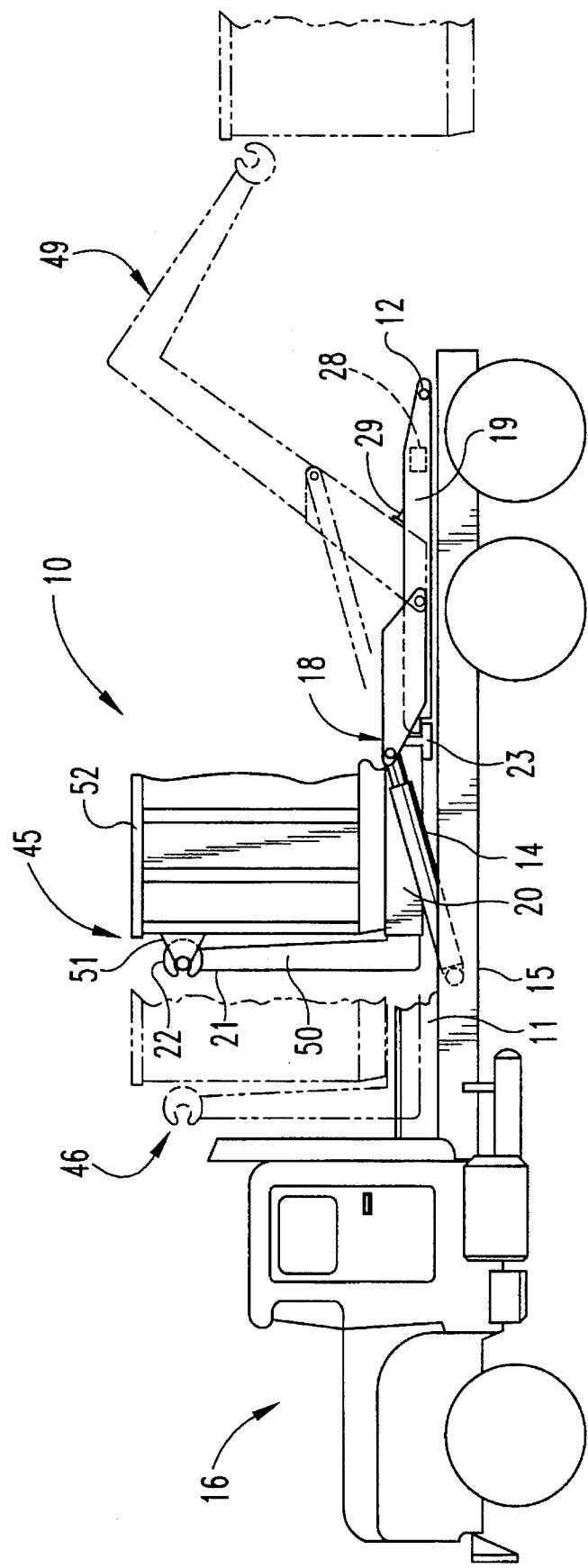
FIG. 1 is a side elevational view of a vehicle mounted hook hoist for loading, transporting and dumping containers in accordance with the preferred embodiment of the present invention.

Generally speaking, a vehicle mounted hoist for loading, transporting and dumping containers includes a tail frame pivotally mounted at a tail frame pivot pin to the rear of a vehicle; a jib assembly pivotally mounted to the tail frame at a jib assembly pivot pin forwardly of the tail frame pivot pin, the jib assembly including a telescopically extendable jib with an outboard end to which is connected a hook configured to engage with a complementary configured apparatus on a container; a pair of hydraulic cylinders connected between the vehicle and the jib assembly and operable to pivot the jib assembly about one of the pivot pins; and, a locking assembly connected with the tail frame and the jib assembly and having a locked condition wherein the jib assembly is locked to pivot as a unit with the tail frame about the tail frame pivot pin, and having an unlocked position wherein the jib assembly is unlocked from the tail frame and able to be pivoted about the jib assembly pivot pin, and wherein the locking assembly is operably connected with the jib so that complete retraction of the jib changes the locking assembly from the locked to the unlocked condition only when the first hydraulic cylinders are retracted and the jib assembly and the tail frame are both in a rest position lying substantially horizontal atop the vehicle.

It is an object of the present invention to provide an improved hoist for loading, transporting and dumping containers.

It is another object of the present invention to provide an improved vehicle mounted, hook hoist with a locking assembly which safely enables pivoting of a jib assembly about a jib assembly pivot pin to load and unload a container and enables pivoting of a jib assembly as a unit with a tail frame about a tail frame pivot pin to dump a container mounted thereon.

Further objects and advantages of the present invention will become apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended.

Referring now to FIG. 1, there is shown a vehicle mounted hook hoist 10 for picking up, transporting and dumping containers in accordance with the preferred embodiment of the present invention. Hoist 10 is generally connected to a subframe 11 for pivotal movement about a tail frame pivot pin 12 via a pair of hydraulic cylinders 14 (one shown). Subframe 11 is mounted to the chassis 18 of vehicle 16 as is known in the art. Hoist 10 generally includes a jib assembly 18, a tail frame 19, and a locking assembly 23. Tail frame 19 is pivotally connected at its rear by tail frame pivot pin 12 to subframe 11 (see FIG. 2). Jib assembly 18 generally includes a jib sleeve 20 and an L-shaped jib 21 with a hook 22 connected at the outboard end thereof.

Figure 6:
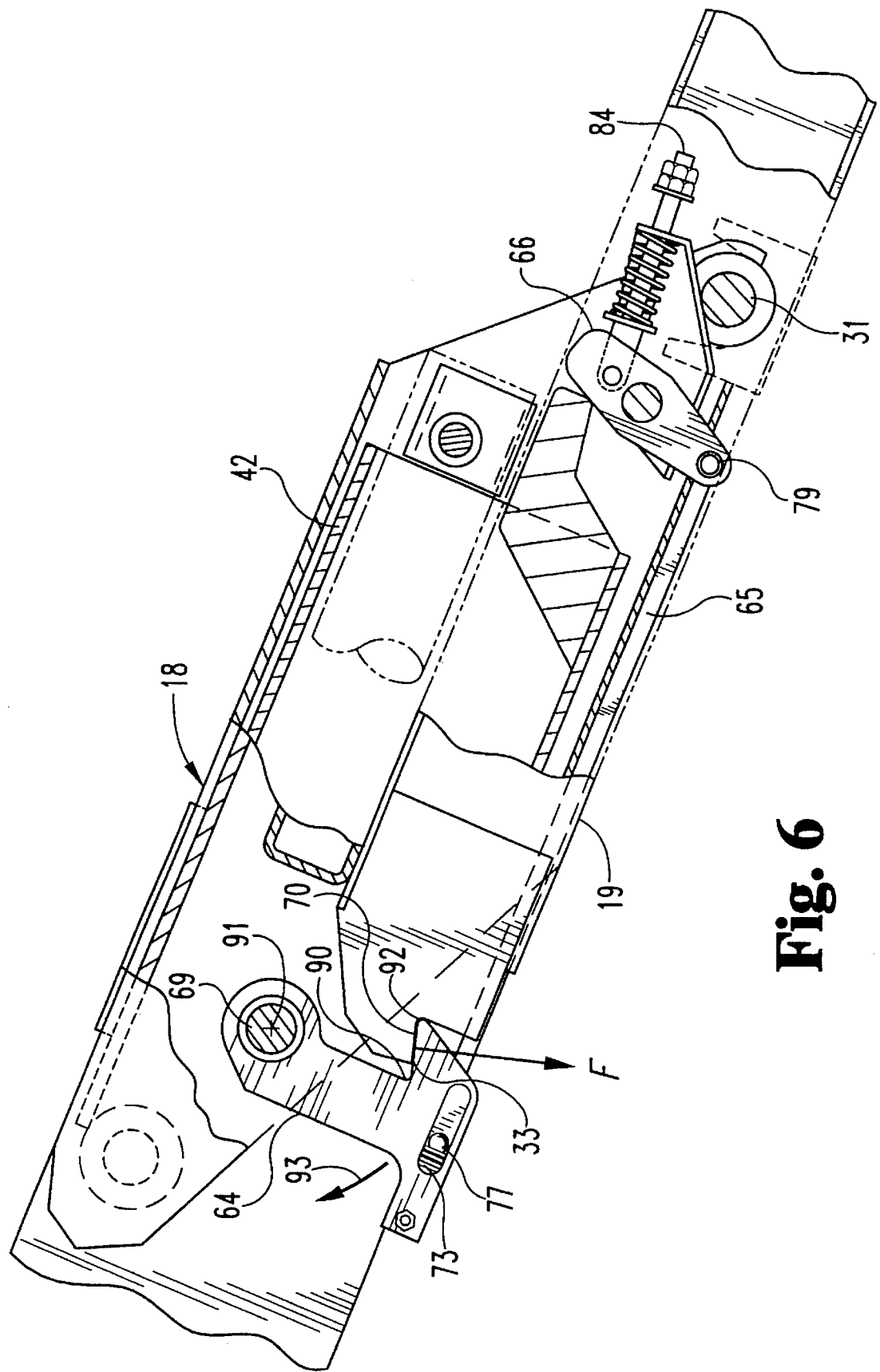
FIG. 6 is a side, partially cross-sectional, fragmented view of jib assembly 18 and tail frame 19 of the hoist of FIG. 1, in an inclined position being pivoted as a unit about tail frame pivot pin 12, and with leg 42 of jib 21 retracted to pivot link 66 to bias latches 64 to an unlocked condition, but with latches 64 remaining locked by virtue of the counter-bevel force acting between surfaces 33 and 70.

Referring now to FIGS. 3, 4, 5 and 7, the specific components of hoist 10 will now be described. Tail frame 19 generally consists of a pair of parallel, box-shaped frame members 26 and 27 which are held rigidly together by cross member 28 (FIG. 1) and angled stop member 29. Also spanning between frame members 26 and 27 are tail frame pivot pin 12 and jib assembly pivot pin 31. The forward end 32 of each frame member 26 and 27 defines a planar, jib-locking surface 33. Surface 33 is slanted forwardly, downwardly, as shown in FIGS. 4 and S, with respect to the longitudinal axis 34 of each frame member 26 and 27. Jib assembly 18 comprises jib sleeve 20, jib 21 with hook 22, and two pairs of generally parallelogram-shaped braces 37, 38, 39 and 40. Jib sleeve 20 has a generally rectangular cross-section and telescopically receives one leg 42 of jib 21 thereby. Four nylon wear pads 48 are mounted on the four sides, at the forward end of the inside of jib sleeve 20 and four nylon wear pads 49 are mounted on the four sides, at the rearward end of the outside of leg 42, as shown in FIG. 6, to enhance the telescopic sliding action of leg 42 within sleeve 20. A double acting hydraulic cylinder assembly 43 is connected by cylinder mount pin 44 at the rear end of jib sleeve 20. The opposite end of hydraulic cylinder assembly 43 is connected at the forward end of leg 42 in a conventional manner. Cylinder assembly 43 operates to extend and retract jib 21 between a retracted position (as shown in solid lines at 45 in FIG. 1) and an extended position (as shown in phantom at 46 for FIG. 1). Jib assembly 18 may be configured to permit extension of jib 21 from retracted position 45 to an extended position which is farther than that indicated at 46 in FIG. 1. This would be particularly useful to push a container onto the dock when jib assembly 18 is completely pivoted to the rear as indicated at 47 in FIG. 1. Also, as described herein, further rearward extension of jib assembly 18 may be achieved by extension of cylinders 14 to pivot tail frame 19 from horizontal after jib assembly 18 has been pivoted to a rearpivot position as indicated at 47.

Jib 21 further defines an upstanding arm 50 which is generally orthogonal to leg 42 (FIG. 6). At the top of arm 50 is rigidly connected a C-shaped hook 22 which is configured to engage with a mating cross bar 51 or similar structure mounted to the front of a container 52. Jib sleeve 20 is mounted for pivotal movement about jib assembly pivot pin 31 by virtue of parallelogram-shaped braces 37–40 as will now be described.

Figure 3:
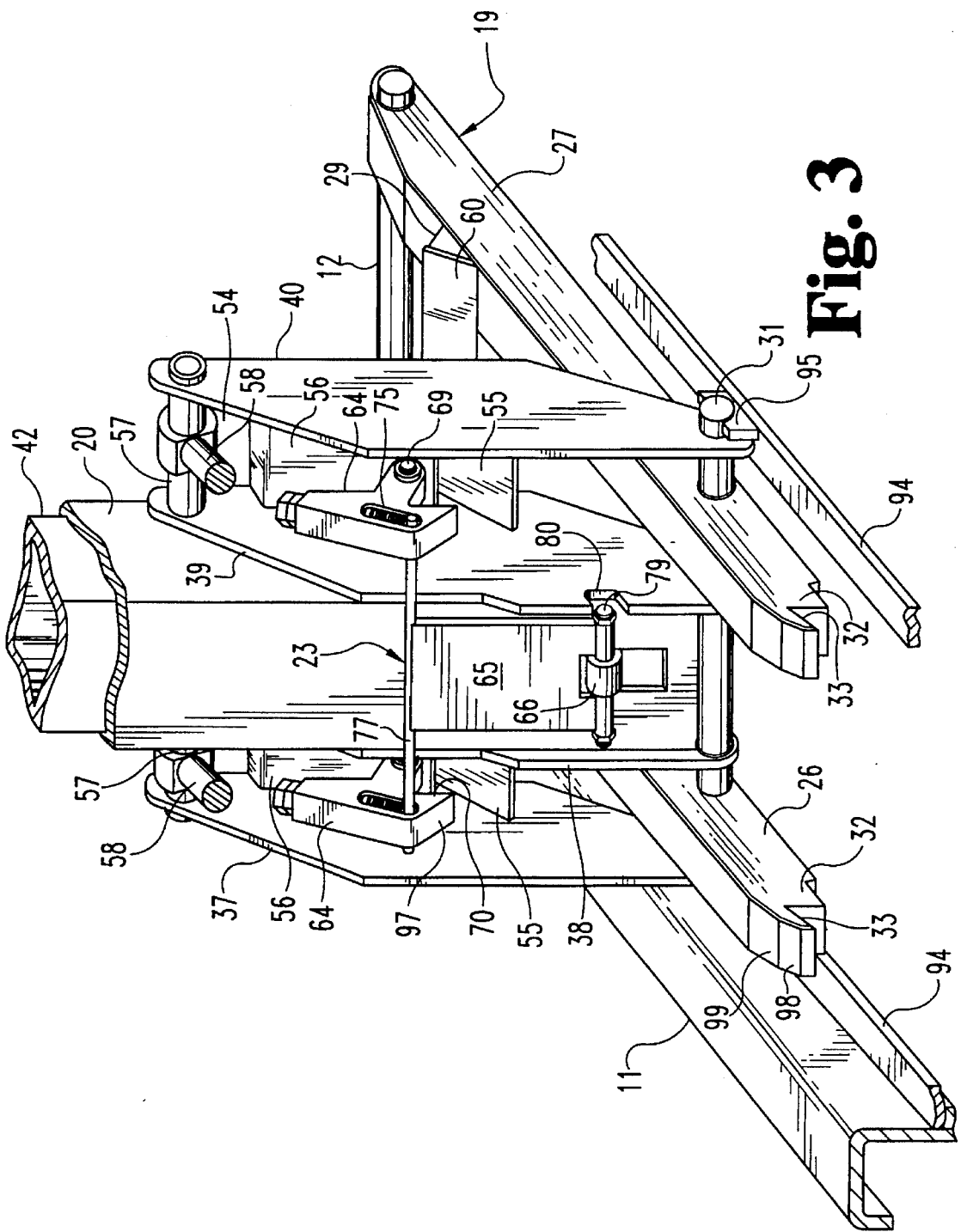
FIG. 3 is a perspective view of jib assembly 18 and tail frame 19 of the hoist of FIG. 1, with jib assembly 18 pivoted about the jib assembly pivot pin 31, and with portions thereof being broken away for clarity.

Inner braces 38 and 39 (FIG. 3) are substantially identical and are rigidly fixed as by welding to the opposing sides of jib sleeve 20. Outer braces 37 and 40 are also substantially identical and are rigidly connected to be mutually parallel with braces 38 and 39 by plates 54 and 55 and box channels 56 welded therebetween. Braces 37–40 and jib sleeve 20 thereby pivot as a unit about jib assembly pivot pin 31 which extends through braces 37–40, frame members 26 and 27 and jib sleeve 20, as shown in FIG. 3. A cylinder mounting pin 57 is mounted at and between the outboard ends of braces 39 and 40. Symmetrically, a cylinder mounting pin 57 is mounted at and between the outboard ends of braces 37 and 38. The piston rods 58 of hydraulic cylinders 14 are mounted for pivotal movement to pins 57. Cylinders 14 are anchored at their opposite ends in an appropriate position to chassis 15 of vehicle 16. Stop member 29 includes a stop plate 60 which is disposed at an angle to frame members 26 and 27 appropriate to engage in planar fashion a nylon wear pad 61 mounted to the top surface of connecting plates 54.

Locking assembly 23 generally includes a pair of spring-loaded latches 64, a connecting rod 77, a connecting plate 65, a link 66, a spring-bias assembly 67 and a pushpost 68. Each of the two latches 64 is pivotally mounted by a latch pivot pin 69 to a corresponding inner brace 38, 39. FIG. 3 and FIGS. 4,5 and 6 show two alternative embodiments. In FIG. 3, box channels 56 are positioned more forwardly and latches 64 are mounted generally below box channels 56 (relative to when jib assembly 18 is in the horizontal rest position depicted in FIG. 4). In FIGS. 4, 5 and 6, box channels 56 are positioned more rearwardly and latches 64 are mounted forwardly of box channels 56. The embodiments are otherwise intended to be the same with latches 64 engaging the planar, jib-locking surfaces 33 in the same manner as described herein. Each spring-loaded latch 64 defines a planar, frame member engaging surface 70, which defines a forward angle with a radial line 71 extending from pin 69 to the middle of surface 70, the angle $\alpha$ being greater than 90°. Surfaces 33 of frame members 26 and 27 are engaged to be coplanar with surfaces 70 when jib assembly 18 is locked with tail frame 19 as described herein. Each latch 64 also defines a channel 72 into which is received a coil spring 73, the spring being held within the channel by a pin 74. A longitudinal slot 75 is defined across the entire width of each latch 64, in communication with channel 72. The width of each slot 75 is less than the diameter of channel 72 so that spring 73 is contained within the corresponding channel 72. A connecting rod 77 engages with both latches 64 to cause them to pivot about their respective pin 69 in unity by extending between the latches 64 and through each of their slots 75 and channels 72, as shown in FIG. 3. Each spring 73 extends within channel 72 between the retaining pin 74 and the rod 77, springs 73 thereby biasing rod 77 to the rear end 78 of each channel 72. Rod 77 is connected as by welding to one end of connecting plate 65. The opposite end of plate 65 is pivotally connected by a pin 79 to one end of link 66. Brace 39 defines a cutout area 80 to provide access to pin 79 for servicing. A bracket assembly 81 is mounted to the inside of jib sleeve 20 as by welding and includes a transversely mounted pin 82 to which is mounted link 66 for pivotal movement thereat. One end of a rod 84 is pivotally connected at 85 to the upper end of link 66. The opposite end of rod 84 slidably extends through a hole 86 in bracket assembly 81 as shown in FIG. 5. Rod 84 defines a spring rest 87, and a coil spring 88 surrounds rod 84 and extends in compression between spring rest 87 and an upper arm 89 of bracket assembly 81 to bias linkage 66 in the counterclockwise rotated position as viewed in FIG. 4. Link 66 thereby pulls both latches 64 counterclockwise (as viewed in FIGS. 4 and 5), via its connection through pin 79, plate 65 and rod 77, into a locking condition. When jib sleeve 20 is in a horizontal rest position atop vehicle 16, as shown in FIG. 4, and when latches 64 are in a locking condition, the frame member-engaging surfaces 70 of latches 64 are juxtaposed trader the planar, jib-locking surfaces 33 of frame members 26 and 27. In this position, if cylinders 14 are extended away from a fully retracted position, biasing jib assembly 18 to rotate clockwise (as viewed in FIG. 4), jib assembly 18 will be positively locked with tail frame 19 and the two will pivot as a unit about tail frame pivot pin 12.

Pushpost 68 is rigidly mounted as by welding to the rear, inside end of leg 42 as shown in FIG. 5 and is configured to engage with link 66 when leg 42 is completely retracted by hydraulic cylinder assembly 43. That is, when cylinder assembly 43 completely retracts leg 42 and jib 21, pushpost 68 pushes the top of link 66, rotating it about pin 82 and pushing plate 65 and connecting rod 77 forwardly. When jib sleeve 20 is in the horizontal rest position relative to tail frame 19, as shown in FIGS. 4 and 5, and cylinders 14 are retracted, there will be a small bit of clearance between surfaces 70 and 33. Thus, as shown in FIG. 5, when pushpost 68 engages with and rotates link 66 clockwise there is virtually no force resisting the leftward movement of rod 77 (as viewed in FIG. 5). Springs 73 are therefore not compressed, and, instead, latches 64 are rotated clockwise and disengaged from frame members 26 and 27. In other words, when tail frame 19 and jib assembly 18 are all in the horizontal rest position, complete retraction of jib 21 rotates link 66 and disengages latches 64 from tail frame 19. Subsequent extension of cylinders 14 pivots jib assembly 18 alone about pin 31 and relative to tail frame 19, as shown in FIG. 3.

Figure 2:
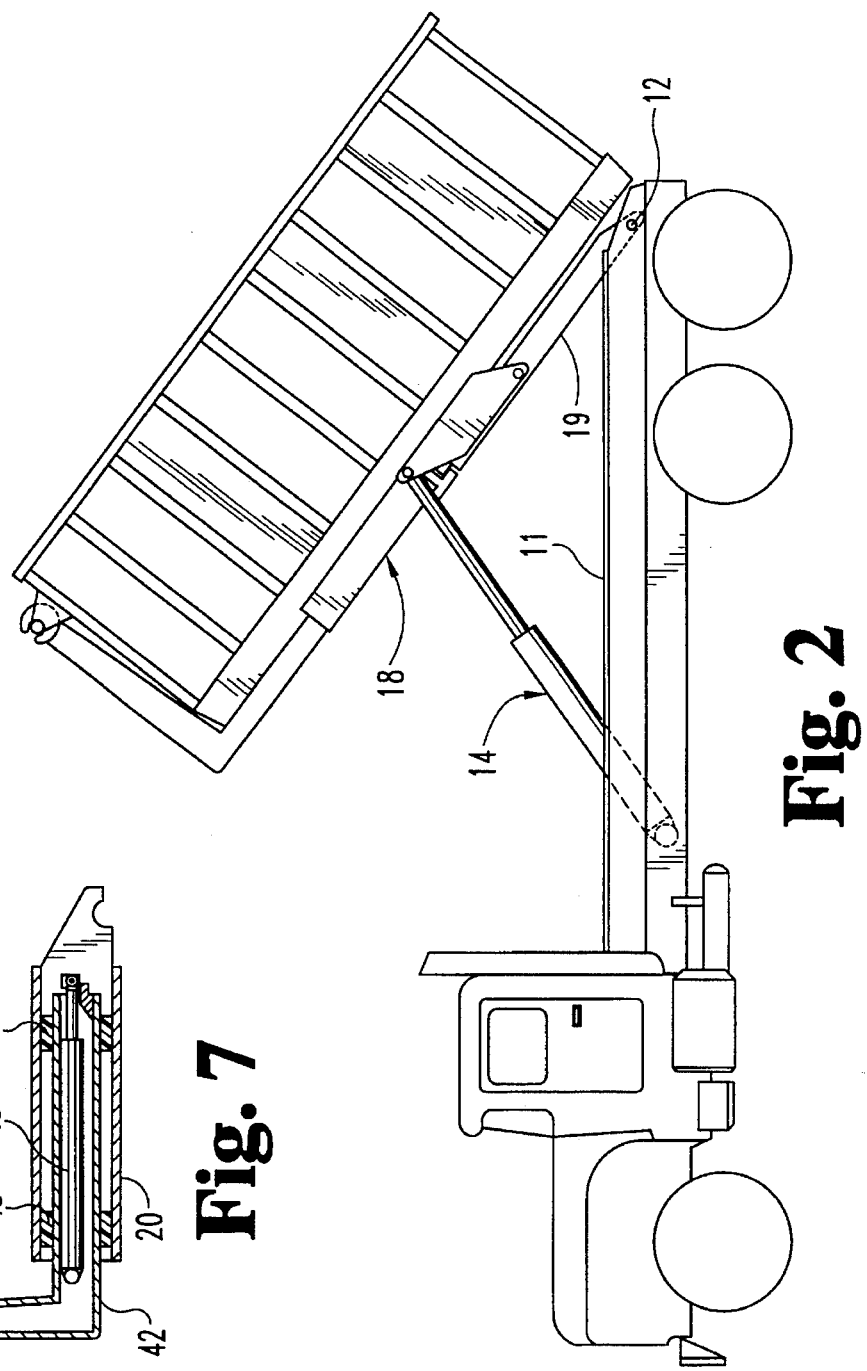
FIG. 2 is a side elevational view of the hoist of FIG. 1 showing the jib assembly 18 and tail frame 19 pivoted as a unit about the tail frame pivot pin 12.

Referring now to FIGS. 2 and 6, when jib assembly 18 is locked with tail frame 19, extension of cylinders 14 causes both jib assembly 18 and tail frame 19 to pivot as a unit about tail frame pivot pin 12. Because angles α of surfaces 70, and correspondingly, coplanar surfaces 33, are greater than 90° as described above, an unlocking rotation of latches 64 would require a slight clockwise pivoting of tail frame 19 about pin 31 relative to jib assembly 18 (as viewed in FIG. 5), which action is in opposition to a resulting force F acting from surface 33 against surface 70. Force F is produced by the combination of the weight of the jib assembly 18 and tail frame 19. If cylinder assembly 43 is powerful enough, jib 21 could be retracted to cause pushpost 68 to rotate link 66, pushing rod 65 forward to rotate latches 64. Because the inside end 90 of surface 33 is radially farther from the pivot pin center 91 than the outside end 92, clockwise rotation of latch 64 (arrow 93) would force surface 33 toward center 91; that is, tail frame 19 would be lifted relative to latch surface 70, against the weight of tail frame 19, jib assembly 18 and any container 52 thereon. However, in the present invention, the spring constant k of spring 73 is selected, relative to the weights and dimensions of the components described above and chosen for a particular hoist, so that the forced forward movement of connecting rod 77 upon complete retraction of leg 42 of jib 21 will compress spring 73 rather than rotate latch 64, as shown in FIG. 6. That is, the force required to compress spring 73 is less than the force required to pivot latches 64 against the force of the combination of weights of jib assembly 18, tail frame 19 and a container thereon, acting at surfaces 70 and 33. The result is that, when jib assembly 18 is locked with tail frame 19, they may only be unlocked by complete retraction of jib 21 when tail frame 19 and jib assembly 18 are pivoted down to their horizontal rest positions shown in FIGS. 1 and 5. This means that jib 21 may be extended or retracted within its complete range at any other time, regardless of the rotated positions of jib sleeve 20 and tail frame 19. This becomes most beneficial when unloading a container by pivoting jib assembly 18 about jib assembly pivot pin 31 from position 45 (FIG. 1) to the rearpivot position 47 (FIG. 1). Further extension of cylinders 14 will rotate tail frame 19 about tail frame pivot pin 12 to the end of the stroke of cylinders 14. It may then be desired to actuate cylinder assembly 43 within jib sleeve 20 and extend jib 21 to push the container 52 rearwardly onto a loading dock.

Referring to FIGS. 3 and 4, a longitudinal rail 94 extends inwardly from both subframes 11. A tail frame rest 95 is fixed to the insides of each subframe 11 and atop the corresponding longitudinal rail 94. When tail frame 19 and jib assembly 18 are in the horizontal rest position, jib assembly pivot pin 31 nests within and is supported by tail frame rests 95.

The configuration of locking assembly 23 of hoist 10 provides for self-locking of jib assembly 18 with tail frame 19. Each latch 64 defines a beveled surface 97 on its lower portion and the top of each forward end 32 of frame members 26 and 27 defines two slanted surfaces 98 and 99. When leg 42 of jib 21 is not completely retracted, and spring-bias assembly 67 is biasing latches 64 in the locked condition, pivoting jib assembly 18 counterclockwise to the horizontal rest position (as viewed in FIG. 5) will cause beveled surface 97 to engage with the slanted surfaces 98 and 99 of tail frame 19, which action will pivot latches 64 clockwise until they clear the lower surfaces 33 of forward ends 32, at which point latches 64 will rotate counterclockwise and lock jib assembly 18 with tail frame 19, as shown in FIG. 4.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle mounted hoist for loading, transporting and dumping containers, comprising;

a vehicle having a rear;

a tail frame pivotally mounted at a tail frame pivot pin to the rear of the vehicle;

a jib assembly pivotally mounted to said tail frame at a jib assembly pivot pin located forwardly of the tail frame pivot pin, said jib assembly including a telescopically extendable jib with an outboard end to which is connected a hook configured to engage with the container;

jib actuation means connected between the vehicle and said jib assembly and being for pivoting said jib assembly about one of the pivot pins;

a locking assembly connected with said tail frame and said jib assembly and having a locked condition wherein said jib assembly is locked to pivot as a unit with said tail frame about the tail frame pivot pin, and having an unlocked condition wherein said jib assembly is unlocked from said tail frame and able to be pivoted about the jib assembly pivot pin, and wherein said locking assembly is operably connected with the jib so that complete retraction of the jib changes said locking assembly from the locked to the unlocked condition only when said jib assembly and said tail frame are both in a rest position lying substantially horizontally atop the vehicle;

wherein said tail frame has at least one rearward end and at least one forward end, the at least one rearward end of said tail frame being pivotally mounted to the rear of the vehicle, and wherein said locking assembly includes at least one latch pivotally operable to engage and lock said tail frame with said jib assembly in the locked condition;

wherein the at least one latch is pivotally mounted to said jib assembly and the jib assembly pivot pin is located between the at least one rearward end and the at least one forward end, and wherein the at least one latch is biased for continuous locking engagement with the at least one forward end of said tail frame;

wherein said locking assembly further includes linkage elements connected with the at least one latch, and wherein, upon complete retraction of said jib, said jib engages with the linkage elements to urge the at least one latch out of locking engagement with the at least one forward end of said tail frame; and, wherein said locking assembly includes latch control means operably connected with the at least one latch and for transmitting movement of the linkage elements upon complete retraction of said jib when said jib assembly and said tail frame are both in the rest position thereby allowing the linkage elements to pivot the at least one latch out of locking engagement with said tail frame, said latch control means further being operable to absorb movement of the linkage elements upon complete retraction of said jib when said jib assembly and said tail frame are in the locked condition and pivoted away from the rest position, said absorption of the linkage movement thereby precluding the linkage elements from pivoting the at least one latch out of locking engagement.

2. The vehicle mounted hoist of claim 1 wherein said latch control means includes a spring operably connected with the linkage elements and the at least one latch.

3. The vehicle mounted hoist of claim 2 wherein said tail frame defines a longitudinal axis, and wherein said latch control means includes the at least one latch defining an upwardly facing frame-member engaging surface, and the at least one forward end defining a downwardly facing jib-locking surface, the jib-locking surface being slanted downwardly, forwardly relative to the longitudinal axis, and wherein the frame-member engaging the surface has a slant which, when the at least one latch is lockingly engaged with the at least one forward end, is parallel, below and complementary to the slant of the jib-locking surface.

4. The vehicle mounted hoist of claim 2 wherein said tail frame defines a longitudinal axis, wherein the at least one latch is pivotally mounted to said jib assembly about a latch pivot pin, wherein the at least one latch defines an upwardly facing frame-member engaging surface which has a middle, wherein the latch pivot pin has an axis, and wherein said latch control means includes the frame-member engaging surface defining a forward angle α with a line extending radially from the axis of the latch pivot pin to generally the middle of the frame-member engaging surface, the angle α being greater than 90°.

5. The vehicle mounted hoist of claim 4 wherein the at least one forward end defines a downwardly facing jib-locking surface, the jib-locking surface being slanted downwardly, forwardly relative to the longitudinal axis, and wherein the frame-member engaging surface is parallel, below and complementary to the jib-locking surface when the at least one latch is lockingly engaged with the at least one forward end.

6. The vehicle mounted hoist of claim 5 wherein the linkage elements include a link pivotally mounted to the jib assembly to be engaged by the jib, and include a plate operably connected between the link and the at least one latch.

7. The vehicle mounted hoist of claim 6 wherein the at least one latch defines a channel which holds the spring, wherein the linkage elements include a rod fixed to the plate, a portion of the rod being positioned within the channel of the at least one latch, wherein the jib has a rear, and wherein upon retraction of the jib, the rear of the jib pivots the link which translates the plate which moves the rod against the spring which pivots the at least one latch if said jib assembly and said tail frame are in the rest position, and which compresses the spring but does not pivot the at least one latch when said jib assembly and said tail frame are in the locked condition and are pivoted about the tail frame pivot pin away from the rest position.

8. The vehicle mounted hoist of claim 7 wherein said tail frame includes a pair of frame members, each having an at least one forward end and wherein there are two of the at least one latches pivotally mounted on opposing sides of said jib assembly.

9. A vehicle mounted hoist for loading, transporting and dumping containers, comprising:

a vehicle having a rear;

a tail frame pivotally mounted at a tail frame pivot pin to the rear of the vehicle;

a jib assembly pivotally mounted to said tail frame at a jib assembly pivot pin located forwardly of the tail frame pivot pin, said jib assembly including a telescopically extendable jib with an outboard end to which is connected a hook configured to engage with the container;

jib actuation means connected between the vehicle and said jib assembly and being for pivoting said jib assembly about one of the pivot pins;

a locking assembly connected with said tail frame and said jib assembly and having a locked condition wherein said jib assembly is locked to pivot as a unit with said tail frame about the tail frame pivot pin, and having an unlocked condition wherein said jib assembly is unlocked from said tail frame and able to be pivoted about the jib assembly pivot pin, and wherein said locking assembly is operably connected with the jib so that complete retraction of the jib changes said locking assembly from the locked to the unlocked condition only when said jib assembly and said tail frame are both in a rest position lying substantially horizontally atop the vehicle;

wherein said tail frame has at least one rearward end and at least one forward end, the at least one rearward end of said tail frame being pivotally mounted to the rear of the vehicle, and wherein said locking assembly includes at least one latch pivotally operable to engage and lock said tail frame with said jib assembly in the locked condition;

wherein the at least one forward end has a first slanted surface and the at least one latch has a second slanted surface complementarily engagable with the first slanted surface, and wherein the at least one latch is pivotally mounted to said jib assembly and is spring biased for continuous locking engagement with the at least one forward end of said tail frame;

wherein the locking assembly includes linkage elements connected with the jib assembly, and wherein, upon retraction of said jib, said jib engages the linkage elements to urge the at least one latch out of locking engagement with the at least one forward end; and, wherein the at least one latch includes a channel which holds a spring with a spring constant k, and wherein the linkage elements include a rod at least partially disposed within the channel of the at least one latch, and wherein the spring constant k is such that when the jib is retracted thereby moving the linkage elements and the rod against the spring, the spring will not compress, but will transmit such movements of the linkage elements to pivot the at least one latch when said jib assembly and said tail frame are in the rest position, but the spring will compress and preclude transmission of such movement to pivot the at least one latch against forces acting between the slanted surfaces when said jib assembly and said tail frame are in the locked condition and one pivoted away from the rest position.

10. The vehicle mounted hoist of claim 9 wherein there are two of the at least one latches.

11. A hook hoist for loading, transporting and dumping containers, comprising:

a vehicle having a rear;

a tail frame having a forward end and a rearward end and being pivotally mounted at a tail frame pivot pin to the rear of the vehicle;

a jib assembly pivotally mounted to said tail frame at a jib assembly pivot pin at a point between the forward and rearward ends, said jib assembly including a telescopically extendable jib with an outboard end, the outboard end having a hook for engaging the container, and wherein said jib assembly and said tail frame define a rest position lying substantially horizontally upon the vehicle:

jib actuation means connected between said vehicle and said jib assembly and being for pivoting said jib assembly about one of the pivot pins;

at least one latch pivotally connected with said jib assembly to lockingly engage with said tail frame so said tail frame and said jib assembly pivot as a unit;

linkage elements operably connected between said at least one latch and said jib to urge said at least one latch out of locking engagement with said tail frame upon complete retraction of said jib;

latch control means operably connected with the at least one latch for permitting retraction of said jib, through said linkage elements, to pivot said at least one latch out of locking engagement with said tail frame when said jib assembly and said tail frame are in the rest position, and operable to prevent retraction of said jib, through said linkage elements, from pivoting said at least one latch out of locking engagement with said tail frame when said jib assembly and said tail frame are pivoted away from the rest position about the tail frame pivot pin;

wherein said at least one latch is biased to pivot into locking engagement, wherein said latch control means includes a spring operably connected with said at least one latch to absorb the urging of said linkage elements to pivot said at least one latch out of locking engagement, and wherein said at least one latch defines an upper locking surface and said tail frame defines a lower locking surface, and wherein said locking engagement includes the lower surface positioned above the upper surface, and wherein both the upper and lower locking surfaces slope forwardly downwardly.

12. A hook hoist for loading, transporting and dumping containers, comprising:

a vehicle having a rear;

a tail frame having a forward end and a rearward end and being pivotally mounted at a tail frame pivot pin to the rear of the vehicle;

a jib assembly pivotally mounted to said tail frame at a jib assembly pivot pin at a point between the forward and rearward ends, said job assembly including a telescopically extendable jib with an outboard end, the outboard end having a hook for engaging the container, and wherein said jib assembly and said tail frame define a rest position lying substantially horizontally upon the vehicle;

jib actuation means connected between said vehicle and said jib assembly and being for pivoting said jib assembly about one of the pivot pins;

at least one latch pivotally connected with said jib assembly to lockingly engage with said tail frame so said tail frame and said jib assembly pivot as a unit;

linkage elements operably connected between said at least one latch and said jib to urge said at least one latch out of locking engagement with said tail frame upon complete retraction of said jib;

latch control means operably connected with the at least one latch for permitting retraction of said jib, through said linkage elements, to pivot said at least one latch out of locking engagement with said tail frame when said jib assembly and said tail frame are in the rest position, and operable to prevent retraction of said jib, through said linkage elements, from pivoting said at least one latch out of locking engagement with said tail frame when said jib assembly and said tail frame are pivoted away from the rest position about the tail frame pivot pin;

wherein said at least one latch is biased to pivot into locking engagement, wherein said latch control means includes a spring operably connected with said at least one latch to absorb the urging of said linkage elements to pivot said at least one latch out of locking engagement, and wherein said at least one latch defines an upper locking surface and said tail frame defines a lower locking surface, and wherein said locking engagement includes the lower surface positioned above the upper surface, and wherein said latch control means includes one of said upper and lower locking surfaces sloping forwardly downwardly, and wherein said at least one latch includes a channel sized and configured to receive the spring.

13. The hook hoist of claim 12 wherein said linkage elements include a first link pivotably mounted to said jib assembly and a second link connected between said first link and said at least one latch, said first link being biased to pull said second link to pull said at least one latch into locking engagement.

14. The hook hoist of claim 13 wherein said linkage elements are sized, configured and mounted so that complete retraction of said jib pivots the first link against its bias to push the second link against the spring of said latch control means and to compress the spring but not pivot said at least one latch out of locking engagement when said jib assembly and tail frame are locked together and pivoted about the tail frame pivot pin, and to pivot said at least one latch out of locking engagement with said tail frame when said jib assembly and said tail frame are in the rest position.

* * * * *

UNITED STATES PATENT AND TRADEMARK OFFICE
CERTIFICATE OF CORRECTION

| | |
|---|---|
| PATENT NO. : | 5,531,559 |
| DATED : | July 2, 1996 |
| INVENTOR(S) : | Kruzick, Kent |

It is certified that error appears in the above-indentified patent and that said Letters Patent is hereby corrected as shown below:

In column 1, line 37, insert a comma after "mechanism".

In column 1, line 40, please change "Fully" to --fully--.

In column 2, line 52, please insert a comma after "container".

In column 3, line 8, please change "18" to --15--.

In column 3, line 24, please change "S," to --5--.

In column 3, line 30, please change "thereby" to --therein--.

In column 3, line 42, please change "for" to --in--.

In column 4, line 28, please insert --$\alpha$-- after "angle".

In column 4, line 31, please change "engaged" to --angled--.

In column 4, line 66, please change "trader" to --under--.

In column 5, line 66, please change "frown" to --from--.

UNITED STATES PATENT AND TRADEMARK OFFICE
CERTIFICATE OF CORRECTION

PATENT NO. : 5,531,559
DATED : July 2, 1996
INVENTOR(S) : Kruzick, Kent

It is certified that error appears in the above-indentified patent and that said Letters Patent is hereby corrected as shown below:

In column 10, line 6, please change "job" to --jib--.

Signed and Sealed this

Eighteenth Day of February, 1997

Attest:

BRUCE LEHMAN

Attesting Officer      Commissioner of Patents and Trademarks